US006619435B1

(12) United States Patent
Watzke et al.

(10) Patent No.: US 6,619,435 B1
(45) Date of Patent: Sep. 16, 2003

(54) DEVICE FOR PREVENTING UNCONTROLLED ACCELERATION OF AN ELEVATOR CAR INSTALLED IN AN ELEVATOR INSTALLATION

(75) Inventors: Franz Watzke, Odelzhausen (DE); Hartmut Liebig, Münich (DE)

(73) Assignee: Inventio AG (CH)

( * ) Notice: Subject to any disclaimer, the term of this patent is extended or adjusted under 35 U.S.C. 154(b) by 0 days.

(21) Appl. No.: 09/913,365

(22) PCT Filed: Feb. 9, 2000

(86) PCT No.: PCT/CH00/00070

§ 371 (c)(1), (2), (4) Date: Sep. 26, 2001

(87) PCT Pub. No.: WO00/47509

PCT Pub. Date: Aug. 17, 2000

(30) Foreign Application Priority Data

Feb. 12, 1999 (DE) .......................................... 199 06 073

(51) Int. Cl.[7] .................................................. B66B 5/16

(52) U.S. Cl. ....................... 187/373; 187/350; 188/189; 24/135 R; 24/136 B

(58) Field of Search ................................ 187/350, 351, 187/358, 359, 370, 373, 374, 375, 376; 24/115 G, 127, 135 A, 135 R, 136 B; 188/188, 189

(56) References Cited

U.S. PATENT DOCUMENTS

| | | | | | |
|---|---|---|---|---|---|
| 228,107 | A | * | 5/1880 | Otis | 187/373 |
| 265,835 | A | * | 10/1882 | Lewis | 24/135 R |
| 1,002,947 | A | * | 9/1911 | Wallace | 24/135 R |
| 1,032,340 | A | * | 7/1912 | Matthews | 187/375 |
| 4,083,432 | A | | 4/1978 | Lusti | 187/373 |
| 4,707,891 | A | * | 11/1987 | Chidester | 24/136 R |
| 5,127,135 | A | * | 7/1992 | Mann | 24/135 R |
| 5,157,814 | A | * | 10/1992 | Mann | 24/135 R |
| 5,230,406 | A | * | 7/1993 | Poon | 187/376 |
| 5,299,661 | A | * | 4/1994 | Pramanik et al. | 187/373 |
| 5,323,877 | A | | 6/1994 | Möri | 187/375 |
| 5,495,919 | A | * | 3/1996 | Ericson et al. | 187/373 |
| 5,782,319 | A | * | 7/1998 | Woodruff et al. | 187/376 |
| 5,797,472 | A | * | 8/1998 | Kamani et al. | 187/373 |
| 5,950,768 | A | * | 9/1999 | Gensike et al. | 187/376 |

FOREIGN PATENT DOCUMENTS

| | | | |
|---|---|---|---|
| EP | 440 839 | | 8/1991 |
| EP | 498597 | * | 8/1992 |
| JP | 352055151 | * | 5/1977 |

* cited by examiner

*Primary Examiner*—Eileen D. Lillis
*Assistant Examiner*—Paul T. Chin
(74) *Attorney, Agent, or Firm*—Ostrolenk, Faber, Gerb & Soffen, LLP

(57) ABSTRACT

A device for preventing uncontrolled acceleration of an elevator car installed in an elevator installation. The device has a limiting cable guided over rollers in a direction of movement of the elevator car. A braking device which is joined to the elevator car is connected to the limiting cable by a release and brakes the elevator car in both a downward and upward direction when the limiting cable transmits a predetermined release force to the release. A speed limiter is connected to one of the rollers and stops the roller when the traveling speed of the elevator car exceeds a predetermined limiting speed either in a downward or upward direction. The release of the braking device is connected by a slide connection to the limiting cable for limiting the force transmitted to the release so that the limiting cable slides through on the side connection when a force is significantly larger than the release force required for releasing the braking device is transmitted from the limiting cable to the release of the braking device.

8 Claims, 5 Drawing Sheets

DEVICE FOR PREVENTING UNCONTROLLED ACCELERATION OF AN ELEVATOR CAR INSTALLED IN AN ELEVATOR INSTALLATION

BACKGROUND OF THE INVENTION

The invention relates to a device for preventing uncontrolled acceleration of an elevator car of an elevator installation both in the upward direction and in the downward direction.

In elevator installations an elevator car is usually connected to a counterweight by a rope over a traction sheave which transmits driving action to the car. To ensure that in the case of a functional fault such as, for example, failure of the driving device, the elevator car is not accelerated in uncontrolled manner by the difference in weight between the elevator car and the counterweight, a corresponding safety device is prescribed. Because the counterweight is usually designed so that when the elevator car is carrying half the permitted rated load there is a state of equilibrium, uncontrolled acceleration can occur in both the downward direction and in the upward direction depending on whether the elevator car is carrying more or less than half the permitted rated load. The safety device must therefore respond both when there is uncontrolled acceleration in the downward direction and in the upward direction.

A device for preventing uncontrolled acceleration of an elevator car in an elevator installation is known, for example, from EP 0 440 839 A1. The safety device according to that printed publication responds both in the case of an uncontrolled acceleration in downward direction and an uncontrolled acceleration in upward direction. To detect the uncontrolled acceleration of the elevator car, a governor rope is provided which is independent of the traction rope and which runs endlessly over an upper return pulley and a lower return pulley. Provided on the lower return pulley is a weight to keep the governor rope constantly taut. Located on the upper return pulley is an overspeed governor. The elevator car is connected to the governor rope via an actuating lever which serves as a tripper and which, when the elevator car is running undisturbed, is constantly transported with the latter so that the speed of rotation of the upper return pulley is proportional to the speed of the elevator car. The overspeed governor detects the speed of rotation of the upper return pulley and is so designed that, when a limit speed of rotation of the upper return pulley is exceeded, the overspeed governor blocks the latter so that the upper return pulley is brought to rest. Because the governor rope is still transported by the elevator car, the governor rope slips over a groove provided in the upper return pulley and thereby experiences a frictional resistance which causes a tripping force to be transmitted via the governor rope to the tripping mechanism of the braking device. Thereupon, the braking device responds and presses brake shoes against a guiderail of the elevator installation so that the elevator car is braked and held. Different brake shoes are provided for braking/holding the elevator car in the downward direction and the upward direction respectively.

As shown in detail below by means of FIGS. 10 and 11, the force which acts on the fall of the governor rope connected to the tripper depends to a substantial extent on whether the elevator car is moving in a downward or an upward direction. Stated simply, if the elevator car is moving upward, the fall of the governor rope connected to the tripper pulls on the weight of the lower return pulley directly. On the other hand, if the elevator car is moving downward, the fall of the governor rope connected to the tripper pulls on the weight of the lower return pulley via the stationary upper return pulley so that in this case the force acting on the rope fall connected to the tripper is substantially increased by friction.

The dimensions of the safety device, particularly of the weight connected to the lower return pulley and of the geometry of the slot provided on the upper return pulley, over which the governor rope is pulled when the upper return pulley is stationary, must therefore be based on the braking operation of the elevator car moving in the upward direction because the tripping force for this case is lower. On the other hand, this also means that the tripping force when the elevator car is moving in a downward direction becomes so large that considerable problems arise with the dimensioning of the governor rope and of the tripper of the braking device, because the governor rope and the tripper must withstand this very high tripping force in the downward direction.

In EP 0 440 839 A1 the suggestion is made of arranging a compensation spring in the governor rope above the tripper. However, this compensation spring increases even further the tripping force in the downward direction, which is already too high anyway, and is therefore disadvantageous.

SUMMARY OF THE INVENTION

The objective of the invention is to create a device for preventing uncontrolled acceleration of an elevator car of an elevator installation in which the tripping force transmitted to the tripper of the braking device is limited.

According to the invention, it is proposed to connect the tripper of the braking device with the governor rope via a slipping connection so that the governor rope slips on the slipping connection if a force is transmitted from the governor rope to the tripper of the braking device which is substantially greater than the tripping force required to trip the braking device. By means of the proposed solution according to the invention, the maximum tripping force which is transmitted is limited, and the tripper of the braking device and the governor rope are thereby protected against overloading. In this manner, the components of the device can be so designed that on the one hand a tripping force is generated sufficient to trip the tripper of the braking device with certainty and thereby arrest an acceleration of the elevator car in the upward direction, but so that on the other hand the tripping force when arresting the elevator car in the downward direction is limited, which prevents overloading the tripper and governor rope.

The slipping connection can be so adjusted that the governor rope only slips on the slipping connection when the elevator car is braked in the downward direction. When the elevator car is braked in the upward direction, the governor rope then slips as hitherto over the stationary upper return pulley without activating the slipping connection according to the invention. Because a much larger force acts on the governor rope when braking the elevator car in the downward direction than when braking in the upward direction, it is sufficient for the slipping connection to slip in the downward direction. The slipping connection can be set with some margin of safety above the tripping force required to trip the braking device.

The slipping connection can be arranged immediately below the rope connector that connects the free ends of the governor rope to each other.

The slipping connection consists preferably of a base plate and a pressure plate which presses against the base plate with a specified compressive force, the governor rope being gripped between the base plate and the pressure plate. To generate the compressive force there is at least one tension screw which passes through and beyond a drilled hole of the pressure plate and can be screwed into a thread of the base plate. The depth to which the screw can be screwed into the thread, and therefore the compressive force, is limited by a tightening stop.

The compressive force can be generated by a compression spring compressed between the base plate and a projection of the tension screw, the compression spring consisting preferably of several cup springs arranged in a stack. The tightening stop can take the form of a sleeve surrounding the tension screw.

The governor rope is preferably guided in a groove in a surface of the base plate and/or the pressure plate which has a preferably triangular cross section. At the ends of the base plate and of the pressure plate the groove opens out into an area which preferably opens out both in the direction of the surface and perpendicular to the surface of the base plate and pressure plate respectively. The tripper of the braking device is fastened to either the pressure plate or the base plate.

BRIEF DESCRIPTION OF THE DRAWINGS

An exemplary embodiment of the invention is described below by reference to the drawings.

The drawings show.

DETAILED DESCRIPTION OF THE PREFERRED EMBODIMENTS

Figure 1:
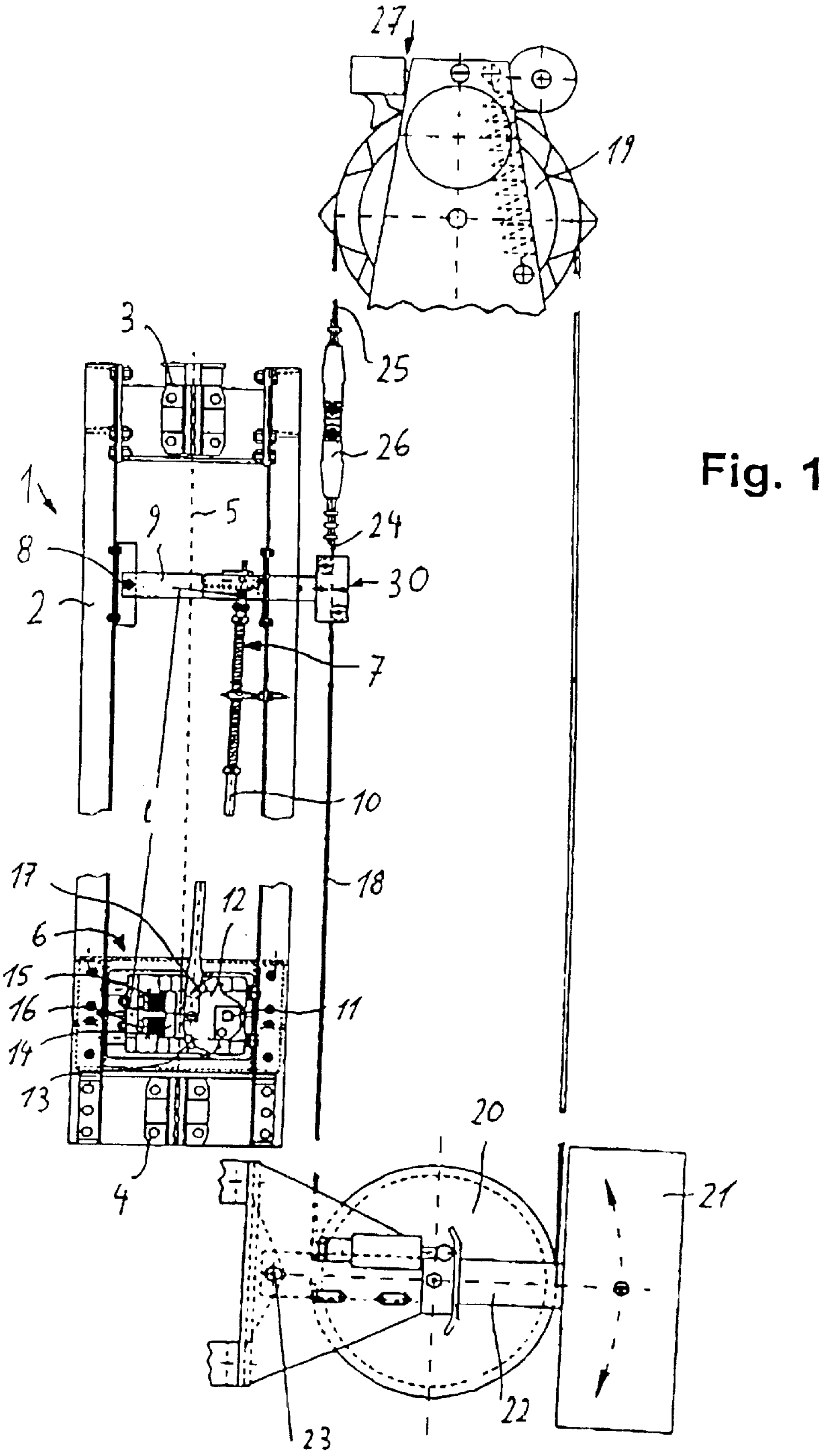
FIG. 1 is an overall view of an exemplary embodiment of the device according to the invention.

FIG. 1 shows an overall view of the device according to the invention for preventing uncontrolled acceleration of an elevator car of an elevator installation.

Only the car frame 2 of an elevator car 1 is shown. The car frame 2 of the elevator car 1 is guided in a vertical path by an upper guide 3 and a lower guide 4 along a guiderail 5 indicated only by the broken line. The elevator car 1 is suspended on a traction rope not shown in the drawing which is reversed over a traction sheave at the upper end of the elevator hoistway and connected to a counterweight. Driving action is applied to the elevator car by the traction sheave. As a rule, the counterweight is so dimensioned that the counterweight is in equilibrium with the elevator car 1 when the elevator car 1 is loaded with approximately half its maximum rated load. Occurrence of an operational fault, especially failure of the drive device, can cause uncontrolled acceleration of the elevator car 1 due to the difference in weight between the elevator car 1 and the counterweight. If the elevator car 1 is loaded with less than half its rated load, this acceleration takes place in the upward direction. On the other hand, if the elevator car 1 is loaded with more than half its rated load, this uncontrolled acceleration takes place in the downward direction. To prevent this uncontrolled acceleration, a braking device 6 is provided which prevents uncontrolled acceleration in both the upward and the downward direction and which can be tripped by a tripper 7. A braking device 6 of a similar type is known, for example, from DE 296 19 729 U1 and EP 0 825 145 A1, and is described in outline only below.

The tripper 7 consists of a lever 9 articulated on a suspension 8 and of a rod 10 connected to the lever 9 which engages in a cam plate 12 supported in a bearing 11. When the lever 9 in FIG. 1 tilts upward, the rod 10 is pushed upward and turns the cam 12 so that a first brake element 13 is pressed into contact with the guiderail 5 (shown only as a broken line) so that the guiderail 5 is gripped between a brake shoe 14 and the first brake element 13. The gripping force is provided by two cup spring assemblies 15 and 16 acting on the brake shoe 14. Deceleration of the elevator car 1 then takes place by removal of metal from the guiderail 5 (shown only as a broken line). The braking process described above relates to braking the elevator car 1 in the case of uncontrolled acceleration in the downward direction.

To decelerate or arrest the elevator car 1 in the case of uncontrolled accelerating movement in the upward direction, the lever 9 in FIG. 1 is tilted downward and the rod 10 pushed downward. As a result, a second brake element 17 is brought into engagement with the guiderail 5 so that the guiderail 5 is gripped between the brake shoe 14 and the second brake element 17.

Tripping of the tripper 7 of the braking device 6 takes place via a governor rope 18, with which the elevator car 1 is connected by the tripper 7 of the braking device 6. In the exemplary embodiment, the governor rope 18 takes the form of an endless rope running over an upper return pulley 19 and a lower return pulley 20. By means of a weight 21 acting on the lower return pulley 20 via a rod 22 which is articulated in a bearing 23, the governor rope 18 is held taut between the upper return pulley 19 and the lower return pulley 20. The free ends 24 and 25 of the governor rope 18 are joined to each other by a rope connector 26.

On the upper return pulley 19 there is an overspeed governor 27 which, on exceeding a specified speed of rotation, brings the upper return pulley 19 to rest, i.e. blocks it. Overspeed governors 27 of this type are known, constructed in various ways.

During normal operation of the elevator installation, the governor rope 18 is transported congruently with the elevator car 1, and the upper return pulley 19 is in its unblocked state. Because the speed of the governor rope 18 is the same as the speed of the elevator car 1, the rotational speed of the upper return pulley 19 is proportional to the speed of the elevator car 1. If the rotational speed of the upper return pulley 19 exceeds a specified limit value, the overspeed governor 27 blocks the upper return pulley 19 so that the governor rope 18 is in slipping contact with the stationary upper return pulley 19. As a result, a force component is exerted on the governor rope 18 which the latter transmits to the tripper 7 of the braking device 6, which in turn causes the braking device 6 to be tripped.

Problematical with such a device for preventing uncontrolled acceleration of the elevator car 1 is that when the elevator car 1 moves in the downward direction, a much greater braking force acts on the governor rope 18 than when the elevator car 1 moves in the upward direction. This situation is explained in greater detail below by reference to FIGS. 10 and 11.

Figure 10:
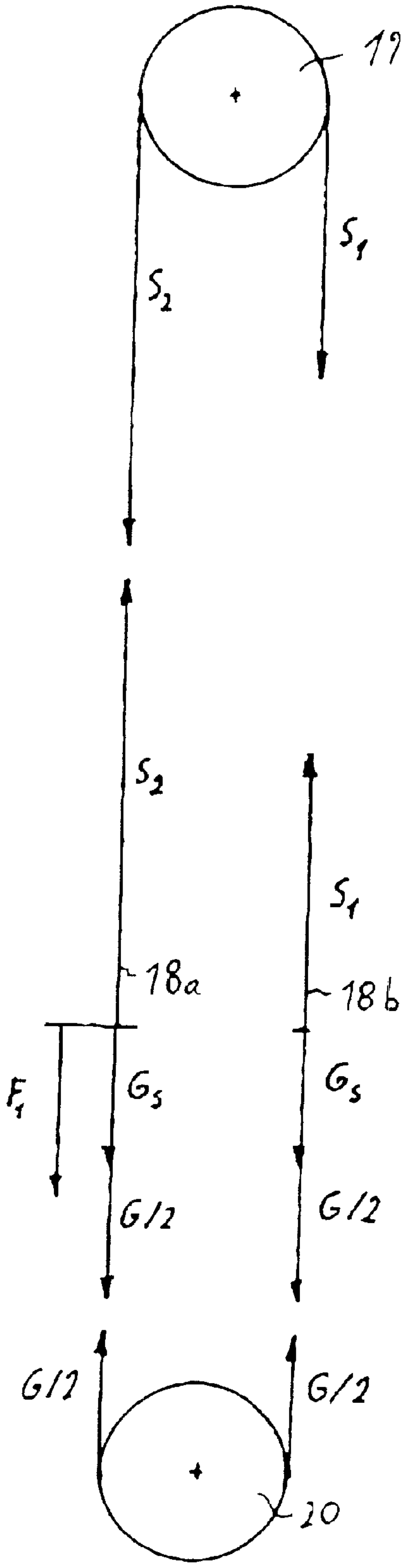
FIGS. 10 and 11 are force diagrams.

FIG. 10 illustrates the situation regarding forces on the governor rope 18, on the upper return pulley 19, and on the lower return pulley 20 when braking the elevator car 1 in the downward direction. After the upper return pulley 19 has been brought to rest, the left-hand fall 18*a* of the governor rope 18 in FIGS. 1 and 10 is at first transported downward. On both the left-hand fall 18*a* of the governor rope 18 and on the right-hand fall 18*b* of the governor rope 18 a force G/2 equivalent to half of the weight 21 acts via the corresponding lever on the rod 22. Acting against this force in both the left-hand fall 18*a* and in the right-hand fall 18*b* of the governor rope 18 is a vectorially opposite counterforce G/2. Also acting on both the left-hand fall 18*a* and on the right-hand fall 18*b* of the governor rope 18 is a force $G_S$ attributable to the weight of the respective fall of the rope. In this case, the governor rope is pulled to the left over the upper return pulley 19. The right-hand force on the stationary upper return pulley 19 is given by the resultant force $S_1$, which is made up of the rope-weight force $G_S$ and the force G/2. Acting on the left-hand fall 18*a* of the governor rope is a correspondingly greater force $S_2$, which is correspondingly increased by the friction on the groove of the upper return pulley 19. To trip the braking device 6, a tripping force can be used consisting of a force $F_1$ acting vectorially downward which results from the difference between the force $S_2$ acting in the opposite direction, the rope weight force $G_S$ plus the force G/2.

Figure 11:
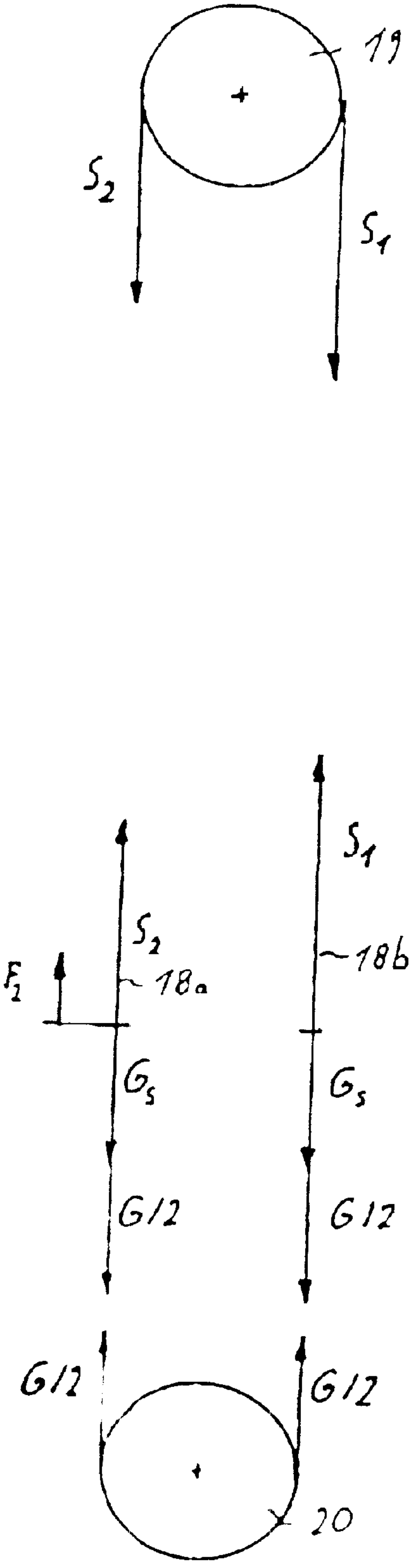

FIG. 11 illustrates the situation when braking the elevator car 1 in downward direction. In this case the governor rope 18 is pulled to the right over the stationary upper return pulley 19. The right-hand force $S_1$ on the upper return pulley 19 is accordingly greater than the left-hand force $S_2$. The result is therefore a vectorially upward directed force $F_2$on the left-hand fall 18*a* of the governor rope 18, which can be used as tripping force for the braking device 6.

The weight force G acting on the lower return pulley 20, and the geometry of the groove of the upper return pulley 19 which determines the relationship between the forces $S_1$ and $S_2$, must be so dimensioned that when the elevator car 1 is braked in the upward direction, the available tripping force $F_2$ is still sufficient to trip the braking device 6 with certainty. Inevitably, when the elevator car 1 is braked in the downward direction, the resulting tripping force $F_1$ is much greater, as FIG. 10 shows.

The same result is obtained if the tripping force F for braking the elevator car either downward or upward is determined by calculation. For the case of braking the elevator car 1 downward, the following equations apply:

$$S_2=G_S+G/2+F_1 \tag{1}$$

$$S_2=S_1+\cdot e^{f(\mu)\cdot\alpha} \tag{2}$$

$$S_1=G_S+G/2 \tag{3}$$

For the case of braking the elevator car 1 in the upward direction, the following equations apply:

$$S_2=G_S+G/2-F_2 \tag{4}$$

$$S_1=S_2\cdot e^{f(\mu)\cdot\alpha} \tag{5}$$

$$S_1=G_S+G_S+G/2 \tag{6}$$

In this system of equations the symbols have the following meanings:

$S_1$ tension on the right of the upper return pulley 19

$S_2$ tension on the left of the return pulley 19

$G_S$ half the weight of the governor rope 18

G tension acting on the lower return pulley 20 caused by the weight 21

$F_{1/2}$ force acting on the tripper 7

$\alpha$ angle of wrap on the upper return pulley 19 ($\alpha$=180°)

$f(\mu)$ coefficient of friction depending on the shape of the groove of the upper return pulley 19

Taking the above equations (4), (5), and (6), and assuming a normal geometry for the groove on the upper return pulley 19, to calculate first the weight force G of the weight 21 acting on the lower return pulley 20 to obtain a specified tripping force in the upward direction $F_2$, and if the required weight force G determined in this manner is inserted in the equations (1), (2), and (3), the effective tripping force acting downward $F_1$ is obtained, which depends on the effective tripping force acting upward $F_2$. For example, if certain tripping of the braking device 6 requires a tripping force of 400N, and if the weight 21 is so dimensioned that these 400N are attained in the upward direction, a force of approximately 1550N is obtained for the tripping force in the downward direction $F_1$, in other words a force almost four times as large as the upwardly acting tripping force $F_2$. This means that both the governor rope 18 and the tripper 7, as well as the associated braking device 6 must be able to withstand this very high tripping force in the downward direction, which requires special design measures and thereby increases the manufacturing costs for the braking device 6 and the tripper 7. Furthermore, a standardized braking device 6 with associated tripper 7 which has official type approval for braking the elevator car in the downward direction, cannot necessarily be used in the upward direction because of the excessive tripping force.

To solve this problem, the present invention proposes to limit the force transmitted to the tripper 7 by connecting the tripper 7 of the braking device 6 to the governor rope 18 by means of a slipping connection 30. The governor rope 18 slips on the slipping connection 30 if a force is transmitted from the governor rope 18 onto the tripper 7 which is significantly greater than the tripping force needed to trip the braking device 6. If the tripping force required is, for example, 400N, the slipping connection 30 can be set so that the latter slips at, for example, 800N. This represents an adequate safety margin relative to the required tripping force of 400N and limits the tripping force of 1550N in the downward direction, which would otherwise occur, to the stated 800N.

Figure 2:
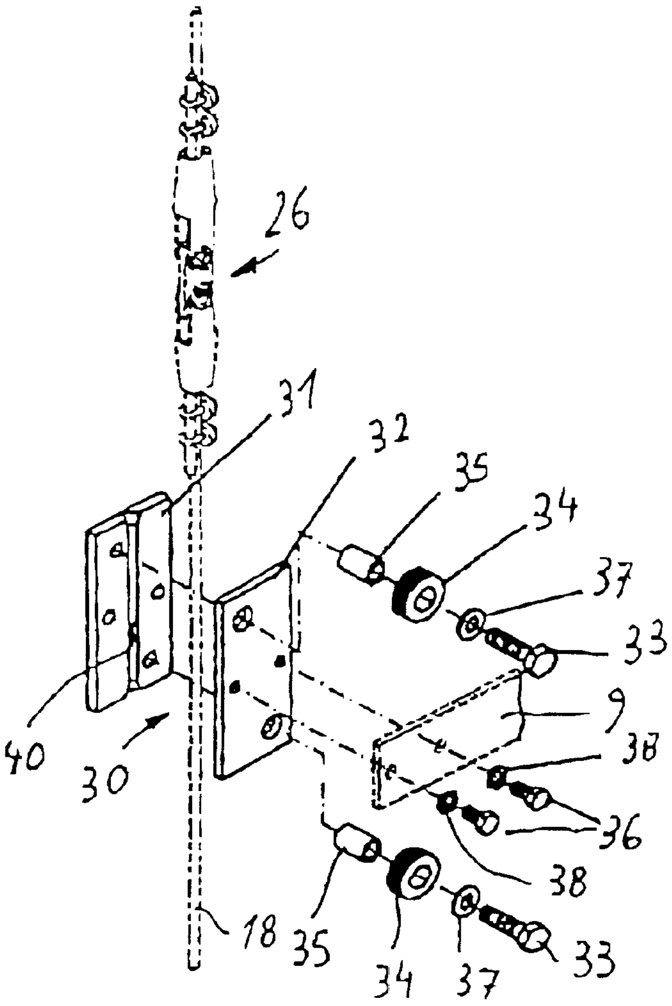
FIG. 2 is an exploded view of the governor rope, the rope connector, and the slipping connection.
Figure 3:
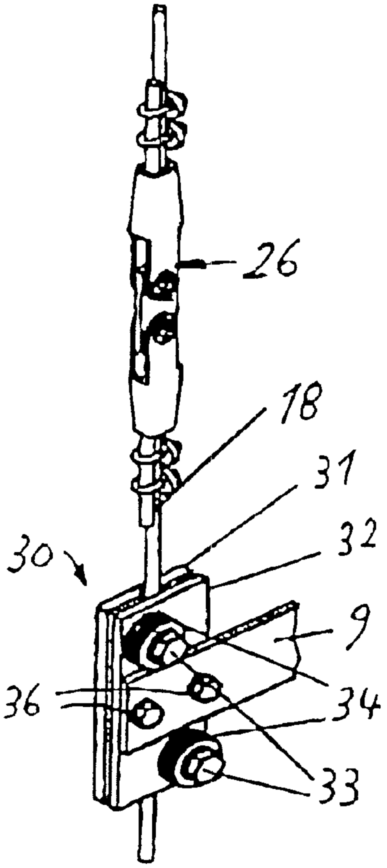
FIG. 3 shows the governor rope, the rope connector, and the slipping connection in the assembled state.

An exemplary design embodiment of this slipping connection 30 is illustrated in FIGS. 2 to 9. FIG. 2 shows the individual parts and their positions for assembly, while FIG. 3 shows the fully assembled slipping connection 30, which is preferably mounted below the rope connector 26 on the governor rope 18. Mounting in a position directly under the rope connector 26 has the advantage that when the slipping connection 30 slips on the governor rope 18 there is an unlimited length available for slipping downward.

In the illustrated exemplary embodiment, the slipping connection 30 comprises a base plate 31, two tension screws 33, two compression springs 34, two tightening stops 35 in the form of sleeves, and assembly screws 36. Between the tension screws 33 and the compression springs 34 first washers 37 are laid, while between the installation screws 36 and the lever 9 of the tripper 7 second washers 38 are laid. On the base plate 31 there is a groove 40 to guide the governor rope 18. It is self-evident that as an alternative, the groove 40 can also be formed on the pressure plate 32, or on both the pressure plate 32 and the base plate 31.

Figure 4:
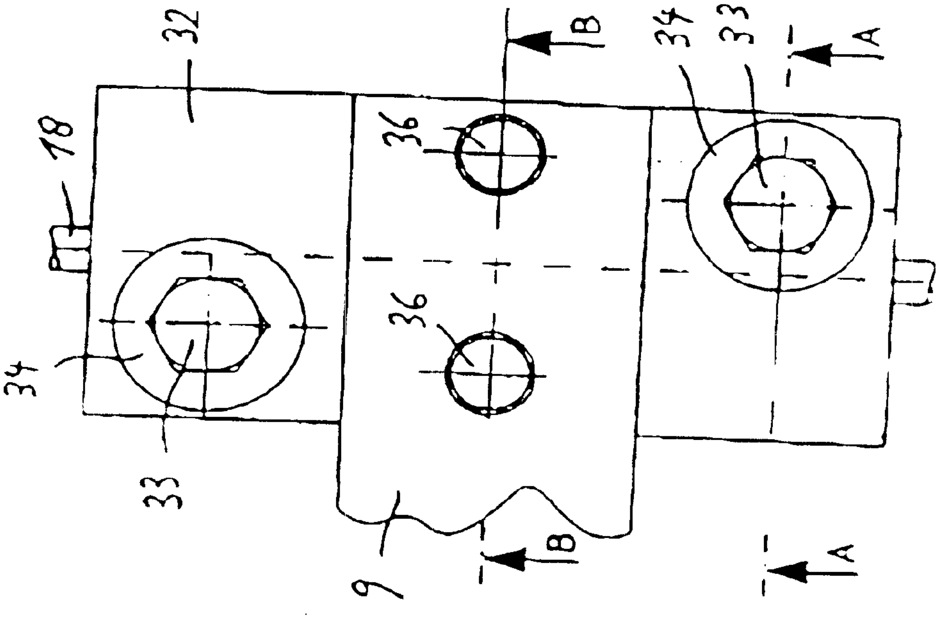
FIG. 4 is a plan view of the slipping connection.

The exemplary embodiment of the slipping connection 30 illustrated in FIGS. 2 and 3 is described in detail below by reference to FIGS. 4 and 6. FIG. 4 shows a plan view of the slipping connection 30, FIG. 5 a section along the line A—A in FIG. 4, and FIG. 6 a section along the line B—B in FIG. 4. Elements which have already been described are given the same reference numbers to facilitate identification.

Figure 5:
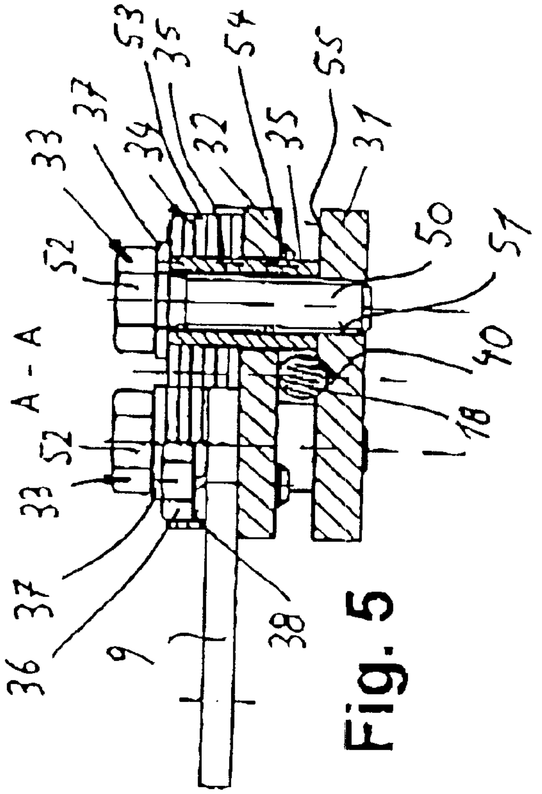
FIG. 5 is a cross section on line A—A in FIG. 4.

As can be seen from FIG. 5, the governor rope 18 is gripped between the base plate 31 and the pressure plate 32. A threaded shaft 50 of each tension screw 33 is screwed into a thread 51 of the base plate 31. By tightening the tension screws 33, an associated compression spring 34, which in the exemplary embodiment illustrated consists of several cup springs 53 arranged in a stack, is gripped between a screw head 52 of the associated tension screw 33, or more precisely the washer 37, and the pressure plate 32. The compressive force exerted by the compression spring 34 depends on the pretension, and therefore on the depth to which the threaded shaft 50 is screwed into the baseplate 31. The depth to which the tension screw 33 is screwed into the base plate 31 is limited by the tightening stop 35. In the illustrated exemplary embodiment, each tightening stop 35 takes the form of a sleeve which surrounds the threaded shaft 50 of the respective tension screw 33. Provided in the pressure plate 32 for each tension screw 33 and each tightening stop 35 is a drilled hole 54 through which both the threaded shaft 50 of the tension screw 33 and the sleeve-shape tightening stop 35 pass and project. The sleeve-shaped tightening stop 35 is gripped between the screw head 52, or more precisely between the washer 37, and the surface 55 of the base plate 31.

In the illustrated exemplary embodiment, two tension screws 33 are provided. It is self-evident that within the scope of the invention only one single tension screw 33, or three or more tension screws 33, can be used.

Figure 6:
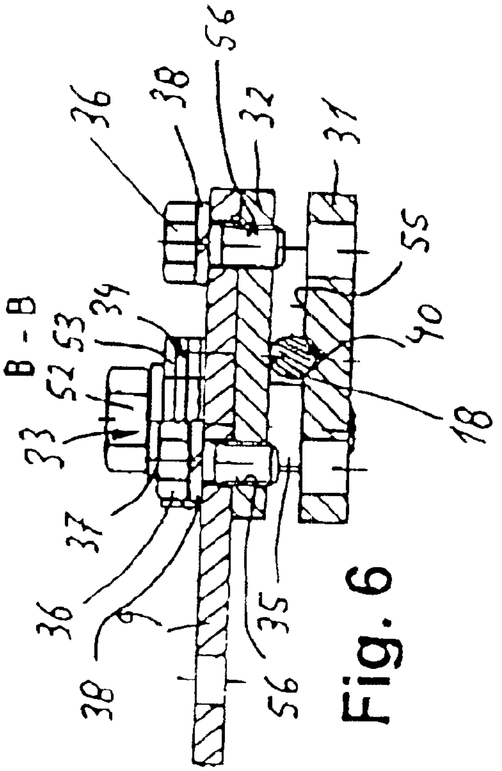
FIG. 6 is a cross section on line B—B in FIG. 4.

As can be seen from FIG. 6, in the exemplary embodiment the pressure plate 32 has threaded holes 56 into which the assembly screws 36 can be screwed, so that the lever 9 of the tripper 7 is connected to the pressure plate 32. As an alternative, it is self-evidently also possible to connect the lever 9 of the tripper 7 to the base plate 31.

Due to the pretension of the compression springs 37 being defined, the force with which the governor rope 18 is gripped between the tension plate 32 and the base plate 31 is defined. By correspondingly dimensioning the length of the sleeve-shaped tightening stop 35, the pretension of the compression springs 37 can be exactly and reproducibly determined. This permits an exact and reproducible determination of that force between the governor rope 18 and the tripper 7 at whose being exceeded the governor rope 18 slips on the slipping connection 30.

Figure 8:
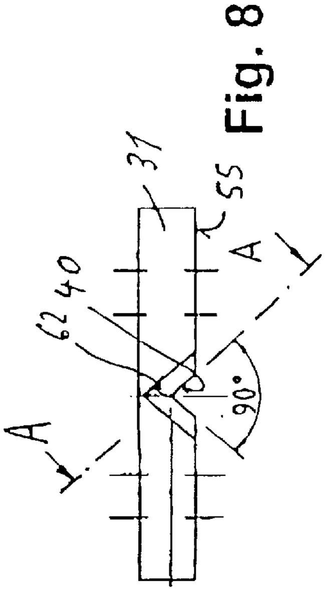
FIG. 8 is a side view of the base plate of the slipping connection.
Figure 9:
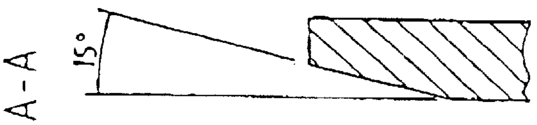
FIG. 9 is a cross section on line A—A in FIG. 8.
Figure 7:
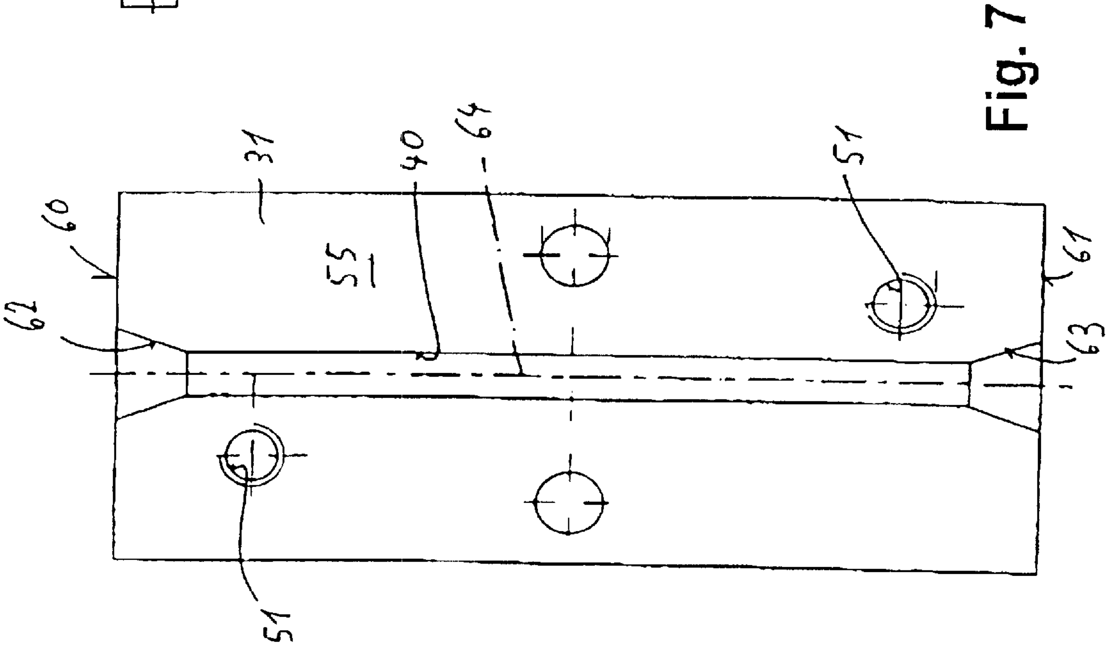
FIG. 7 is a plan view of the base plate of the slipping connection.

The geometry of the groove 40 formed in the base plate 31 is described in greater detail below by reference to FIGS. 7, 8, and 9. FIG. 7 shows a plan view of the base plate 31, FIG. 8 shows a side view of the base plate 31 illustrated in FIG. 7, and FIG. 9 shows a section along the line A—A in FIG. 8. Elements which have already been described are given the same reference numbers to facilitate identification.

Visible in FIG. 7 is the groove 40 which runs longitudinally in the surface 55 of the base plate 31, and which widens at each end 60 and 61 of the base plate 31 into an opening area 62 and 63 which will be described in more detail. Visible in FIG. 8, which shows a side view of the base plate 31 looking onto one of the two ends 60, is the preferred triangular cross section of the groove 40. Also visible is that in the opening area 62, the groove 40 opens both in the direction of the surface 55 and also perpendicular to the surface 55 of the base plate 31.

Visible in FIG. 9 is the section along the line A—A in FIG. 8 in which the preferred opening angle of 15° can be seen. The angle formed by the two flanks of the triangular groove 40 is preferably approximately 90°.

By means of the opening areas 62 and 63, an abrupt kinking of the governor rope 18 is avoided, should the longitudinal axis 64 of the groove 40 not run exactly parallel to the direction of tension of the governor rope 18.

As already mentioned, it is self-evident that the groove 40 can also be alternatively or additionally provided on the pressure plate 32.

Within the scope of the invention it is also conceivable that not only the upper return pulley 19 or the lower return pulley 20 is brought to rest by the response of the overspeed governor 27, but the governor rope 18 itself. For this purpose, the pulleys 19 and 20 can take the form of, for example, synchronized tangential pulleys instead of return pulleys. By means of the flexible slipping connection 30, created according to the invention between the tripper 7 and the governor rope 18 instead of the rigid connection used hitherto, the slipping connection 30 which is connected via the tripper 7 and the braking device 6 to the elevator car 1 can slip both in the upward and in the downward direction after the tripping force required to trip the braking device 6 is exceeded. This increases the flexibility of the construction of the safety device.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A device for preventing uncontrolled acceleration of an elevator car of an elevator installation, comprising: pulleys; a governor rope guided over the pulleys in a direction of movement of the elevator car; a braking device; a tripper arranged to connect the braking device to the governor rope so that the braking device brakes the elevator car in both a downward and an upward direction when the governor rope transmits a specified tripping force to the tripper; an overspeed governor operatively connected one of directly to the governor rope and to at least one of the pulleys, so as to bring at least one of the pulleys, or the governor rope, to rest when a speed of travel of the elevator car exceeds a specified limit speed either in the downward direction or in the upward direction; and a slipping connection arranged to connect the braking device to the governor rope so as to limit the force transmitted to the tripper, whereby the governor rope slips on the slipping connection when a force is transmitted from the governor rope to the tripper of the braking device which is significantly greater than the tripping force needed to trip the braking device.

2. A device according to claim 1, wherein the slipping connection includes a base plate and a pressure plate pretensioned against the base plate with a specified compression force, the governor rope running between the base plate and the pressure plate.

3. A device according to claim 2, wherein the pressure plate has at least one drilled hole, and further comprising: a tension screw arranged to pass through and protrude from the drilled hole, the tension screw being screwable into a thread in the base plate; and a tightening stop arranged so as to limit a depth to which the tension can be screwed.

4. A device according to claim 3, and further comprising a compression spring clamped between a projection of the tension screw facing away from the base plate and the pressure plate.

5. A device according to claim 4, wherein the projection is a screw head of the tension screw.

6. A device according to claim 4, wherein the compression spring comprises several cup springs arranged in a stack.

7. A device according to claim 2, wherein at least one of the base plate and the pressure plate have a surface with a groove, the governor rope being guided in the groove.

8. A device according to claim 7, wherein the groove has a triangular cross section.

* * * * *